United States Patent [19]

Gardner et al.

[11] Patent Number: 5,538,413
[45] Date of Patent: Jul. 23, 1996

[54] APPARATUS FOR STRENGTHENING WELD LINES IN MOLDED PARTS

[75] Inventors: Garrett Gardner, Lyndeboro; Robert Malloy, Londonderry, both of N.H.

[73] Assignee: University of Massachusetts Lowell, Lowell, Mass.

[21] Appl. No.: 235,428

[22] Filed: Apr. 29, 1994

[51] Int. Cl.$^6$ .................................................. B29C 45/76
[52] U.S. Cl. .......................... 425/145; 425/149; 425/577; 264/71; 264/328.12
[58] Field of Search ............................ 425/139, 144, 425/146, 149, 577, 544, 555, 571, 145; 264/71, 72, 328.8, 328.12

[56] References Cited

U.S. PATENT DOCUMENTS

| | | | |
|---|---|---|---|
| 3,213,492 | 10/1965 | Zelewsky . | |
| 3,447,587 | 6/1969 | Bodine, Jr. | 164/49 |
| 4,469,649 | 9/1984 | Ibar | 264/23 |
| 4,722,679 | 2/1988 | Farrell | 425/146 |
| 4,729,863 | 3/1983 | Muller et al. | 264/328.12 |
| 4,749,536 | 6/1988 | Farrell | 264/219 |
| 4,767,312 | 8/1988 | Huttner | 264/328.12 |
| 4,820,149 | 4/1989 | Hatakeyama et al. | 425/577 |
| 4,840,760 | 6/1989 | Oishi | 264/328.12 |
| 4,900,485 | 2/1990 | Murakami | 425/149 |
| 5,017,311 | 5/1991 | Furusawa et al. | 264/23 |
| 5,059,368 | 10/1991 | Allan et al. | 264/69 |
| 5,069,832 | 12/1991 | Akumura et al. | 264/23 |
| 5,069,833 | 12/1991 | Yokoi et al. | 264/23 |
| 5,127,814 | 7/1992 | Johnson et al. | 425/130 |
| 5,156,858 | 10/1992 | Allan et al. | 425/145 |
| 5,160,466 | 11/1992 | Allan et al. | 264/69 |
| 5,254,306 | 10/1993 | Inada et al. | 264/328.12 |
| 5,310,330 | 5/1994 | Zweig et al. | 425/561 |

FOREIGN PATENT DOCUMENTS

| | | |
|---|---|---|
| 90/08024 | 1/1990 | WIPO . |
| 94/12332 | 11/1993 | WIPO . |

OTHER PUBLICATIONS

Kirkland, C., "A Closer Look at Inmold Oscillation," *Injection Molding*, p. 59, vol. 3, No. 7, (Jul., 1995).

Allan, P. S. and Bevis, M. J., "Shear Controlled Orientation in Extrusion," Plastics, Rubber & Composites Processing & Applications, vol. 16, No. 2, pp. 133–137 (1991).

Gardner, Garrett, "A Moving Boundary Technique in Injection Molding to Remove Weld Lines," Abstract sent to the Society of Plastics Engineers, (1992, Oct.).

Gardner, Garrett, "A Moving Boundary Technique in Injection Molding to Improve Weld Line Strength," James B. Francis Scholarship Paper, (1993, May).

Harry, David H., "Direct Cavity Pressure Control of Injection Molding," General Motors Institute, pp. 53–55 (1974).

Allan, P. S. and Bevis, M. J., "Multiple Live–Feed Injection Moulding." Plastics & Rubber Processing & Applications, vol. 7, No. 1, pp. 3–10 (1987).

Allan, P. S. and Bevis, M. J., "Multi Live–Feed Moulding for Avoidance of Microporosity and for the Production of Specified Fibre Orientation and Distributions in Fibre Reinforced Materials," Second European Conf. on Composite Materials, London, pp. 1.144–1.151 (1987, Jul.).

Allan, P. S. and Bevis, M. J., "Recent Developments in Fibre Management by Multi Live–Feed Moulding." Plastic & Rubber Institute, Second Inter'l. Conf. Automated Composites 88, Netherlands, pp. 25/1–25/9 (1988, Sep.).

(List continued on next page.)

*Primary Examiner*—Khanh P. Nguyen
*Attorney, Agent, or Firm*—Hamilton, Brook, Smith & Reynolds

[57] ABSTRACT

An apparatus for strengthening weld lines in molded parts includes a mold body having a mold cavity formed within the mold body. A reciprocating pin extends along a longitudinal axis through the mold body. The reciprocating pin is adapted to reciprocate between a position flush with the inner surface of the mold cavity and a position slightly away from the mold cavity to displace material within the mold cavity and strengthen weld lines formed in the molded part.

19 Claims, 6 Drawing Sheets

OTHER PUBLICATIONS

Allan, P. S. and Bevis, M. J., "Multiple Live–Feed Processing as a Route for Fibre Management in Composite Materials." Paper presented at Int. Conf. on New Materials & Their Applications, pp. 13–23 (1990).

Allan, P. S. and Bevis, M. J., "Development and Application of Multiple Live–Feed Moulding for the Management of Fibres in Moulded Parts," Composites Manufacturing, vol. 1, No. 2, pp. 79–84 (1990, Jun.).

Gibson, J. R., et al., "The Multiple Live–Feed Moulding of DMCs," Composites Manufacturing, vol. 1, No. 3, pp. 183–190 (1990, Sep.).

Gibson, J. R., et al., "Recent Developments in Shear Controlled Orientation of Reinforcement in Polymer Matrix Mouldings," Plastics & Rubber International, pp. 12–14 (1991, Oct./Nov.).

Pinwill, I. E., et al., "Application of Shear Controlled Orientation Technology to Powder Injection Moulding," Powder Metallurgy, vol. 35, No. 2, pp. 1–6 (1992).

Utaka, Y., "Studies of In–Mold Resin Behavior in Local Pressurization Molding," *Kasei Kako* '94, 55–56 (Jun., 1994). (English translation provided).

Utaka, Y., et al., "Local Vibrating and Pressurizing Device Press $\alpha$," *Seikei Kakou*, 5(11):712–718 (Sep., 1993). (English translation provided).

Yumoto, T., et al., "New Gateless Molding System by the Press Gate Method", *Purasuchikku Seikei Gijutsu*, 9(12):73–80. (English translation provided).

Schmidt, L. R. and Maxam, J. L., "Injection Molding of Polycarbonate Optical Disks Using an Oscillatory Boundary Condition," ANTEC, pp. 447–451 (1992).

De Gaspari, J., "Novel Injection Molding Techniques Move Toward Commercialization," Plastics Technology, pp. 17–19 (1992, Oct.).

Allan, P. S., et al., "Eliminating Weld Lines in Injection Moulding By Controlled Orientation," Plastics & Rubber Institute Conference, London, pp. 19/1–19/9 (1986, Dec.).

APPARATUS FOR STRENGTHENING WELD LINES IN MOLDED PARTS

BACKGROUND

In injection molding of plastics, plastic is typically melted in an extruder by a rotating screw and then forced into a mold cavity. The material is allowed to cool in the mold cavity and then is ejected after solidifying. During the filling phase, the molecular orientation of the plastic can become aligned with the direction of flow due to viscous drag. This molecular orientation can have a pronounced effect on the molded part's mechanical properties. The anisotropy due to the molecular orientation is especially pronounced in fiber filled plastics. Flow of the material within the mold may also introduce another type of material defect called a weld line.

A weld line is the term used to describe the aesthetic and structural defect that occurs when a molten plastic flow front is divided and rejoined within the mold during the mold filling process. The visual defect associated with the weld line can be accompanied by an inconsistency of the material in the weld area. As a result, the strength of the molded part in the region of the weld line can be greatly reduced in comparison to surrounding areas.

Weld lines are commonly caused by core pins within the mold cavity of a mold. Core pins are usually employed to form holes within molded parts. FIG. 1, depicts a prior art mold 10 having a core pin 114. The core pin 114 is located within mold cavity 112 of mold 110 to form a hole in the molded part. When plastic is injected into mold cavity 112 via runner 122 and gate 116, the core pin 114 divides the flow of plastic within cavity 112. The divided flows of plastic flowing around core 114 partially solidify by the time they rejoin downstream of core 114. As a result, the two flows of plastic are unable to fully mix with each other when rejoined and a weld line 120 forms downstream of core 114. The weld line may have a small V-notch on the surface of the molded part where the two plastic flow fronts meet due in part to volatiles and gases which are trapped in the weld line area. The V-notch may be prominent enough to cause aesthetic problems as well as form a stress concentrating region. Weld lines are also commonly caused by complex flow patterns in a mold due to variable wall thicknesses or multiple flow entrances to a mold.

Several techniques have been used to improve the weld line strengths of injection molded parts. One such method is disclosed in U.S. Pat. No. 3,213,492 in which an injection mold and its core are moved laterally relative to each other to knead material within the mold. This causes the material that has flowed around the core to homogeneously fuse and bond in order to strengthen the weld line caused by the core. A problem with this approach is that its usefulness is limited by the geometry of the molded part since the molded part must have a hole. Additionally, a molded part such as large flat rectangular plate with a central hole which is filled from one end will have little benefit from this technique. This is due to the fact there will be little kneading effect on the material outside of the range of the kneading motion. As a result, it is possible for a large portion of a weld line to be unaffected by the kneading motion. Another problem of this approach is that the apparatus is relatively complex and expensive. Furthermore, moving the mold and core relative to each other while a part is solidifying may cause damage to a an intricate or delicate mold.

Another present method is disclosed in U.S. Pat. Nos. 5,059,368, 5,156,858 and 5,160,466 in which an oscillating piston or pistons external to the mold cavity oscillate the molding material back and forth within the mold to mix the material and eliminate or strengthen weld lines. This equipment is external to the mold and communicates to the material in the mold through several conduits. The placement of the conduits relative to the mold controls the location within the mold in which mixing occurs. A problem with this approach is that the apparatus is external to the mold and is rather large, complex and costly. The part geometry must also be suitable for this method because orifices which allow the oscillating plastic flow to enter and exit the mold cavity must be placed so as to be opposite each other with the desired affected area laying in between these orifices.

SUMMARY OF THE INVENTION

Accordingly, there is a need for a simple, compact and relatively inexpensive apparatus which can strengthen weld lines in injection molded parts regardless of the part geometry.

The present invention provides a mold for strengthening weld lines within molded material. The mold includes a mold body with a mold cavity formed within the mold body. The mold cavity has a mold cavity surface. A reciprocating member extends along a longitudinal axis through the mold body. The reciprocating member is adapted to reciprocate along the axis to displace an amount of molding material within the mold cavity by its movements. The reciprocating member only displaces material and does not add to the geometrical features of the molded material.

In preferred embodiments, the reciprocating member reciprocates between a position flush with the mold cavity surface and a position slightly away from the mold cavity. A reciprocating cam coupled to a fluid operated cylinder has a surface in contact with the reciprocating member. Actuation of the cylinder reciprocates the cam which in turn reciprocates the reciprocating member.

The present invention apparatus is a relatively compact, simple and inexpensive apparatus which implements a local displacement of the molding material in the mold for the purpose of either controlling the local flow direction and its associated orientation effects or to promote localized mixing within the mold to bring about a substantial increase in the weld line strength of a molded part. The present invention apparatus is not limited by part geometry and can strengthen the weld line of a molded part with no more affect upon the part than a witness line left from the border of the moving weld line boundary.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 1:
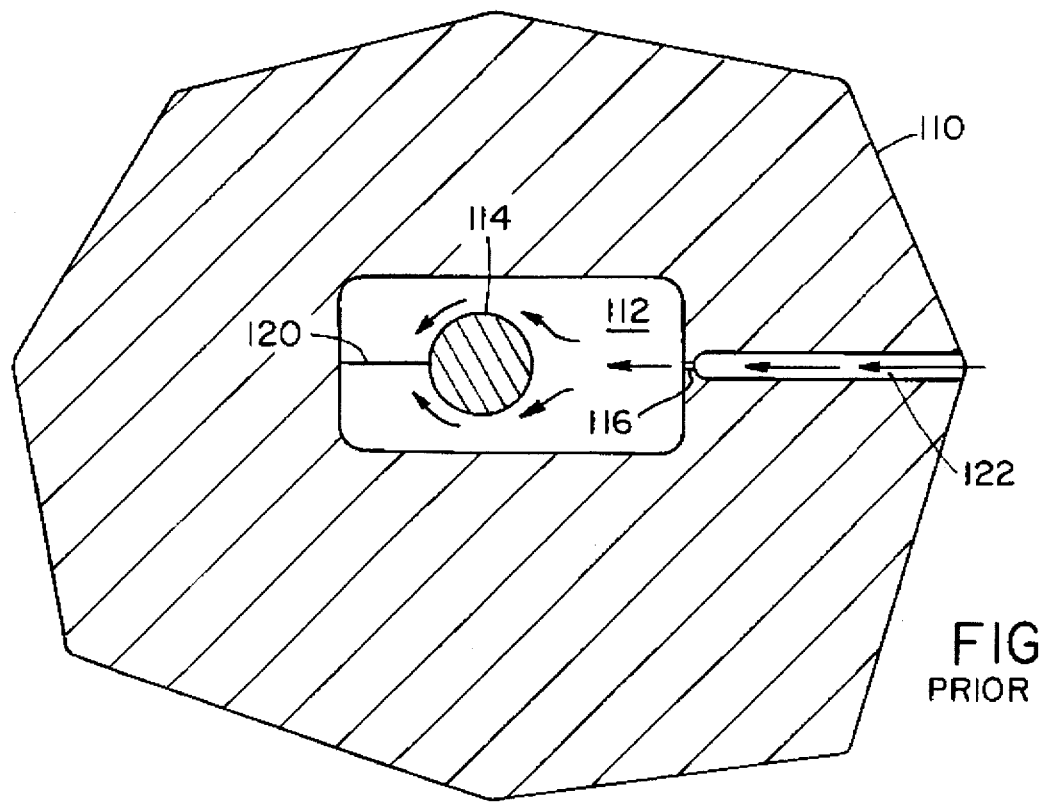
FIG. 1 is a top sectional view of a prior art injection mold.
Figure 3:
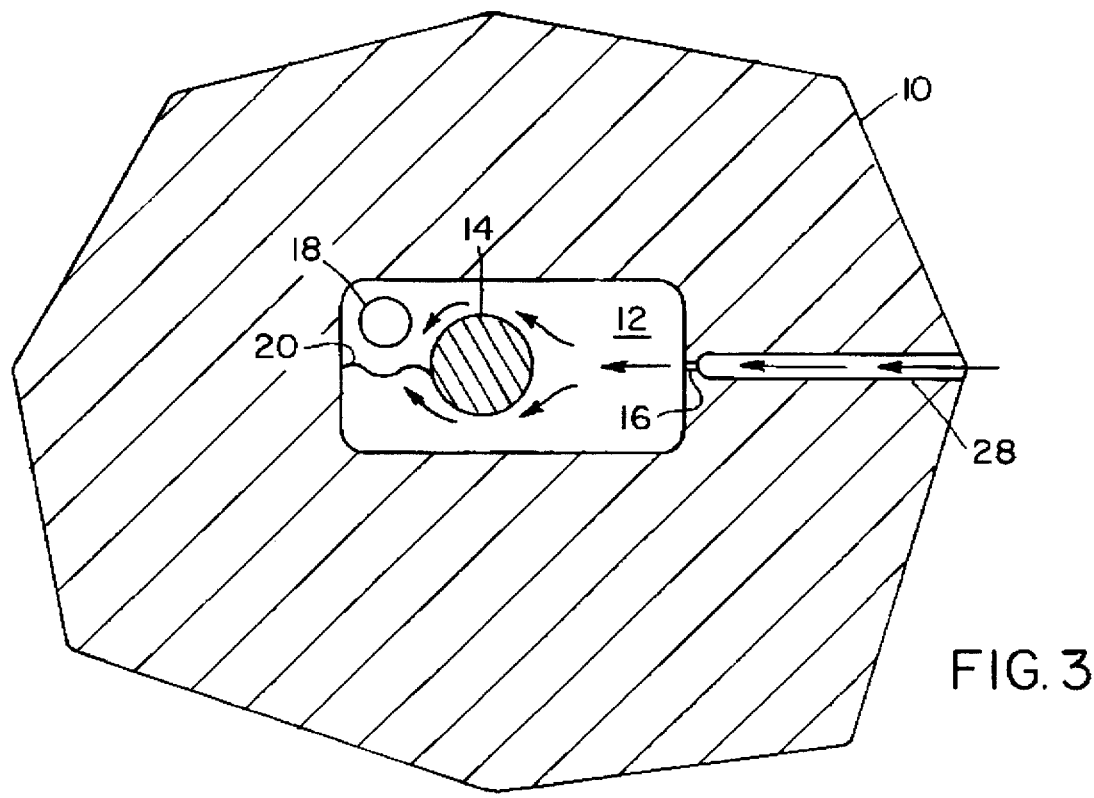
FIG. 3 is a top sectional view of the present invention mold showing the mold cavity.
Figure 2:
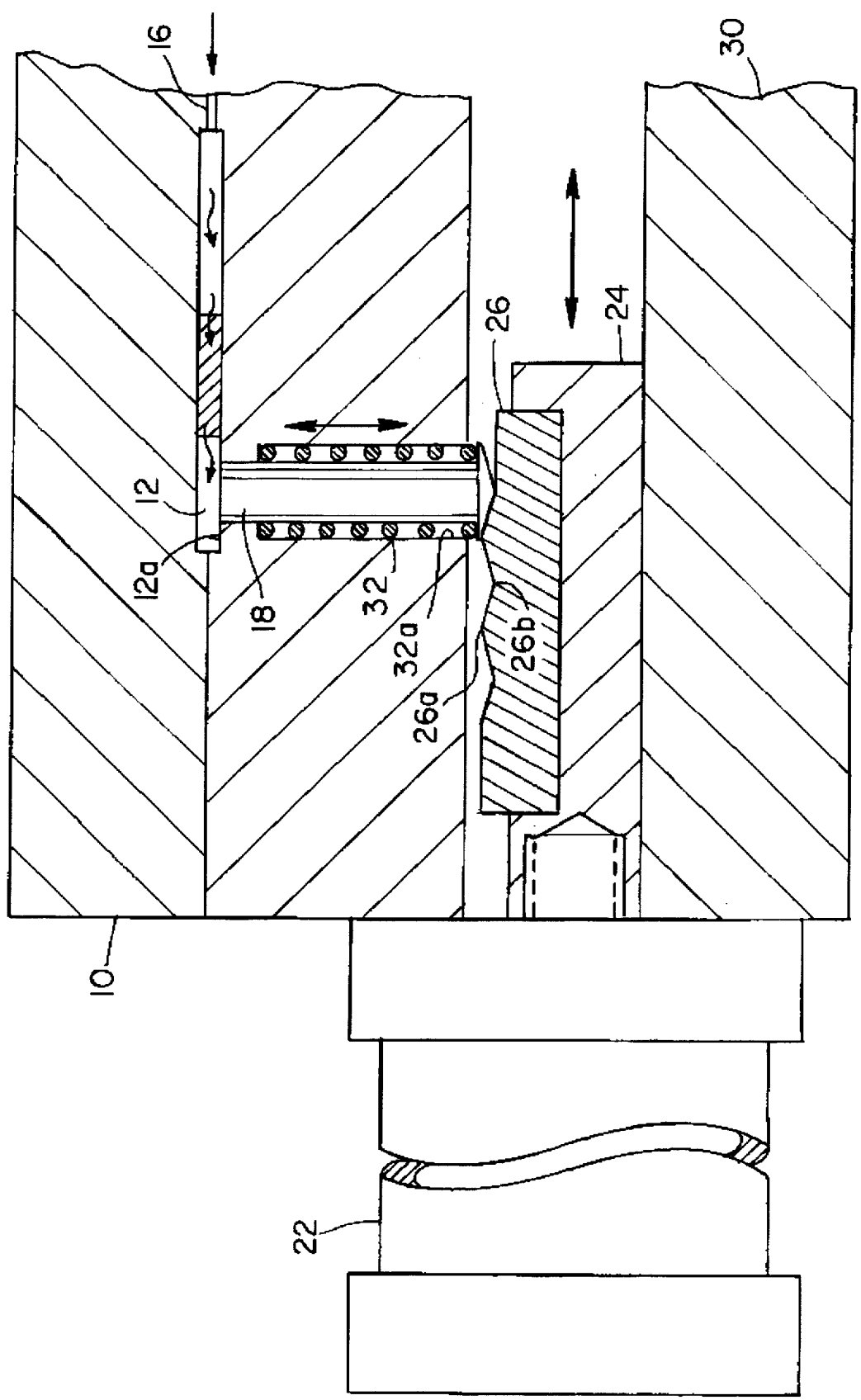
FIG. 2 is a side sectional view of the present invention apparatus.

Referring to FIGS. 2 and 3, a mold 10 for receiving and molding plastic from an injection molding machine is depicted. The mold 10 has a mold cavity 12 for receiving plastic, an oscillating or reciprocating pin 18 and a gate 16. The gate 16 is a narrowed section of flow connecting the mold cavity 12 to the flow passage or runner system 28 in the mold. This gate 16 is narrow to permit quick solidification of the material in the gate 16 and to permit easy removal of plastic solidified in the runner system 28 from the molded part. The mold 10 may include a solid member in the mold cavity 12 such as a core 14, or any other manner of flow obstruction to create a through hole in the molded part. As described above, the use of a core causes a weld line 20.

Coupled to the side of mold 10 is a fluid operated cylinder 22 such as a hydraulic cylinder. Fastened to the reciprocating rod of cylinder 22 is a cam plate 24 upon which sliding cam 26 is mounted. Cam plate 24 is supported by support plate 30. Cam 26 includes a series of hills 26a and valleys 26b which pin 18 travels over when cylinder 22 is reciprocated. Movement of the series of hills 26a and valleys 26b relative to pin 18 oscillates or reciprocates pin 18 vertically. A return spring 32 within bore 32a biases pin 18 against cam 26. Although cylinder 22 is preferably a hydraulic cylinder, alternatively, cylinder 22 can be a pneumatic cylinder.

In operation, mold material, such as plastic, is injected by an apparatus such as a plastic injection molding machine through the runner 28 and gate 16 into the mold cavity 12. During filling, the flow front of the injected plastic is divided by the core 14. The divided flow fronts come together on the downstream side of core 14 causing a weld line 20. The weld line 20 is typically defined as the aesthetic and structural defect that occurs when a molten molding material flow front is divided and rejoins again during the mold cavity 12 filling process. Pin 18 is positioned in mold cavity 12 within a reasonable proximity to the area in which the weld line 20 will be formed. During this filling phase of the process, the pin 18 will start to move from its initial position and cycle one or more times to end its movement in a position flush to the cavity surface. Preferably, pin 18 moves between a position flush with mold cavity surface 12a and a position away from mold cavity 12. Alternatively, pin 18 can move between a position flush with mold cavity surface 12a and a position within mold cavity 12.

The pin 18 is moved up and down by the combined effects of cam 26 and return spring 32. When the proper time during the filling phase elapses, cylinder 22 pushes the cam holder block 24 and cam 26 horizontally causing the pin to ride up and down vertically on the hills 26a and valleys 26b of the cam 26. The return spring 32 pushes down on the pin 18 ensuring contact with the cam 26 surface at all times. Although pin 18 is shown to be in sliding contact with cam 26, alternatively, pin 18 can have a roller which contacts cam 26 for reduced friction.

The vertical movements of the pin 18 push the molding material laterally in the mold and across the weld line 20, thereby causing the material in the region of weld line 20 to mix. This strengthens weld line 20. The weld line 20 is diminished in its structural as well as visual defect. No extra time in the molding cycle is needed to accomplish this technique.

Figure 4:
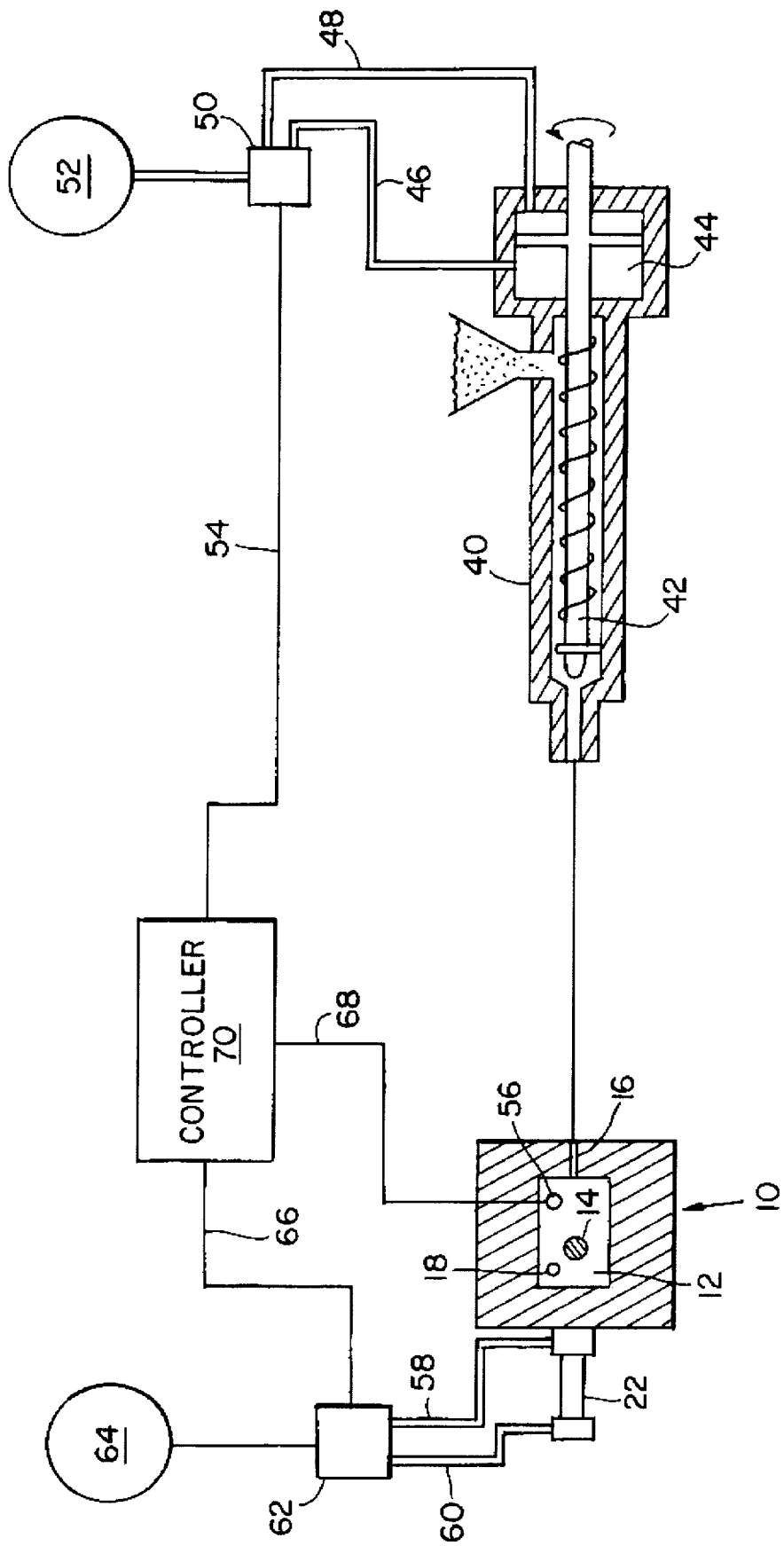
FIG. 4 is a schematic drawing of the control system for present invention apparatus.

FIG. 4 depicts the control system for timing the reciprocation of pin 18. An injection molding machine 40 having a screw 42 reciprocated by a hydraulic cylinder 44 is coupled via gate 16 to cavity 12 of mold 10. In order for injection molding machine 40 to inject molten plastic into mold cavity 12, controller 70 activates solenoid valve 50 via line 54 to allow hydraulic fluid from hydraulic unit 52 to flow into hydraulic cylinder 44 via line 48. The hydraulic cylinder 44 pushes screw 42 forward to inject plastic into mold cavity 12. Hydraulic fluid existing in hydraulic cylinder 44 is bled from hydraulic cylinder 44 via line 46. As the plastic flows into mold cavity 12, pressure sensor 56 within mold cavity 12 senses the presence of plastic within mold cavity 12. Pressure sensor 56 notifies controller 70 of the presence of plastic within mold cavity 12 by providing a signal to controller 70 via line 68. Controller 70 in turn sends a signal to solenoid valve 62 via line 66 to activate solenoid valve 62. This provides hydraulic power to cylinder 22 via lines 60 and 58 so that cylinder 22 can be reciprocated. The reciprocation of cylinder 22 in turn reciprocates pin 18. After a predetermined amount of time, controller 70 closes solenoid valve 62 to terminate the movement of pin 18. The time required for reciprocating pin 18 varies upon the size of the molded part.

Although the present invention has been described to initiate the reciprocation of pin 18 with a pressure sensor 56, alternatively, other suitable sensors can be used such as a strain gauge or a temperature sensor. Additionally, the timing for reciprocating pin 18 can also be initiated by the movements or component positions of the injection molding machine 40 such as movement or position of screw 42. The timing for pin 18 can also be determined solely on the basis of time or can be accomplished by manually opening the pressurized media to the cylinder 22 when the injection molding machine begins to inject plastic into mold 10.

Figure 5:
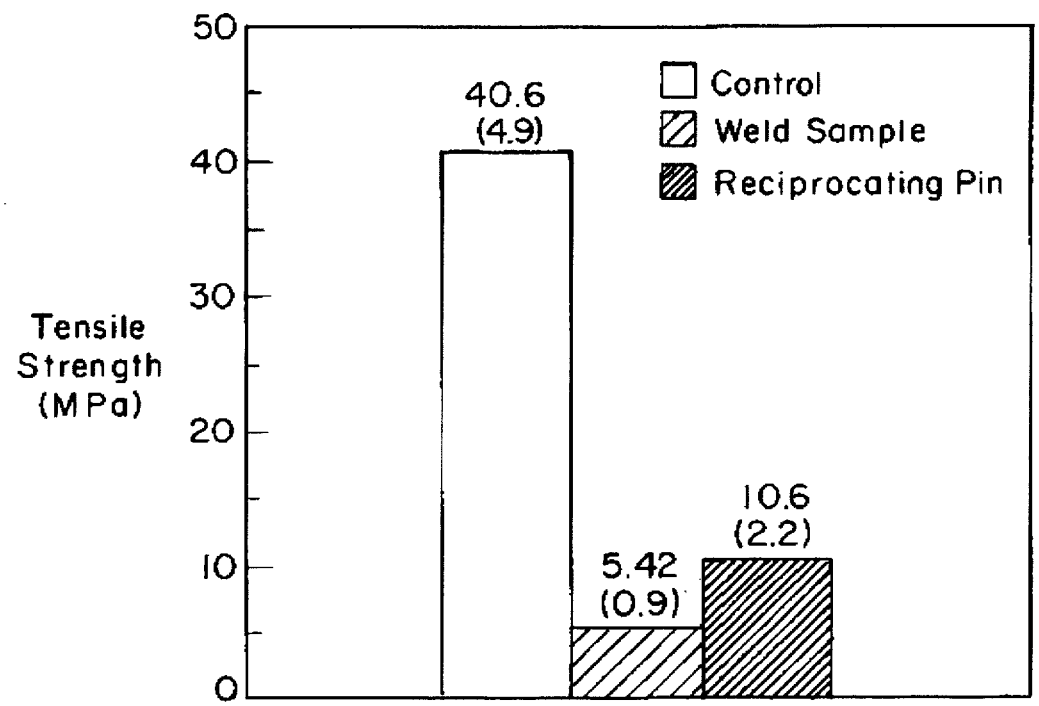
FIG. 5 is a graph depicting the tensile strengths for a molded plastic sample without a weld line, a sample with an unstrengthened weld line, and a sample with a weld line strengthened by the present invention apparatus.

Referring to FIG. 5, it can be seen that although the tensile strength of a weld line 20 strengthened by the reciprocating pin of the present invention is not as strong as a molded control sample having no weld line, the strengthened weld line caused by the reciprocating pin 18 is almost double an unstrengthened weld line of a molded weld line sample.

Figure 7:
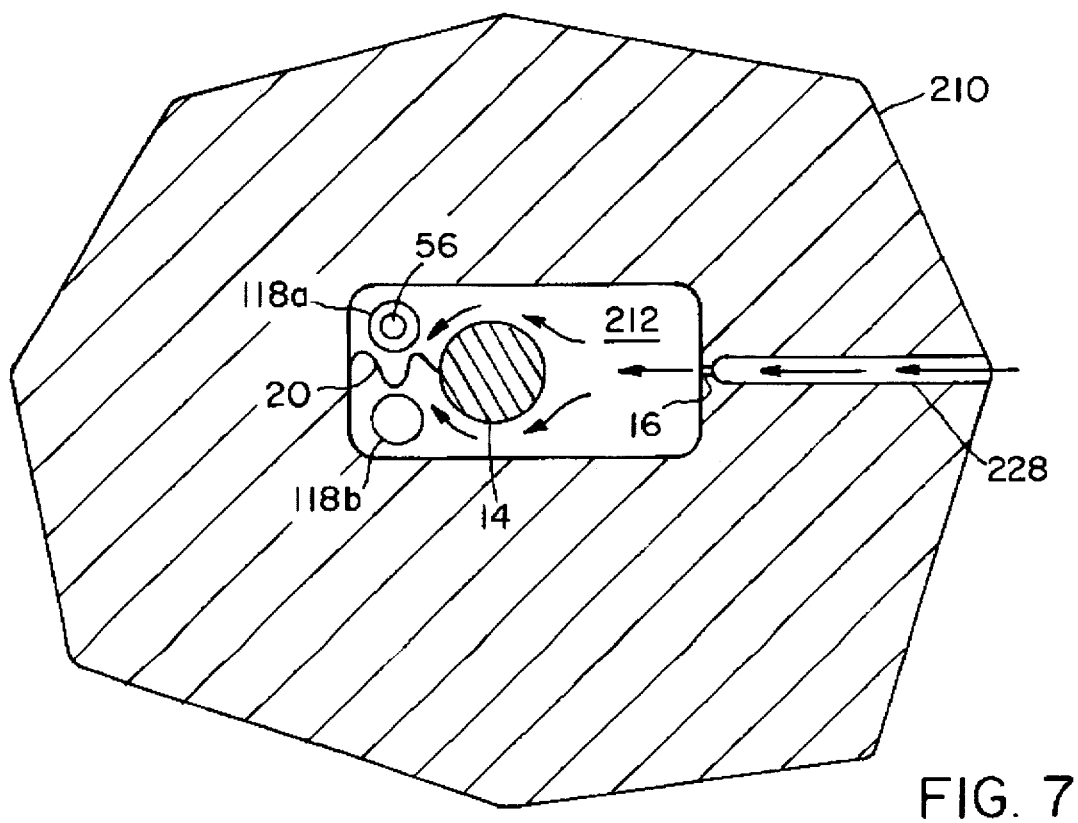
FIG. 7 is a top sectional view of the embodiment of FIG. 6.
Figure 6:
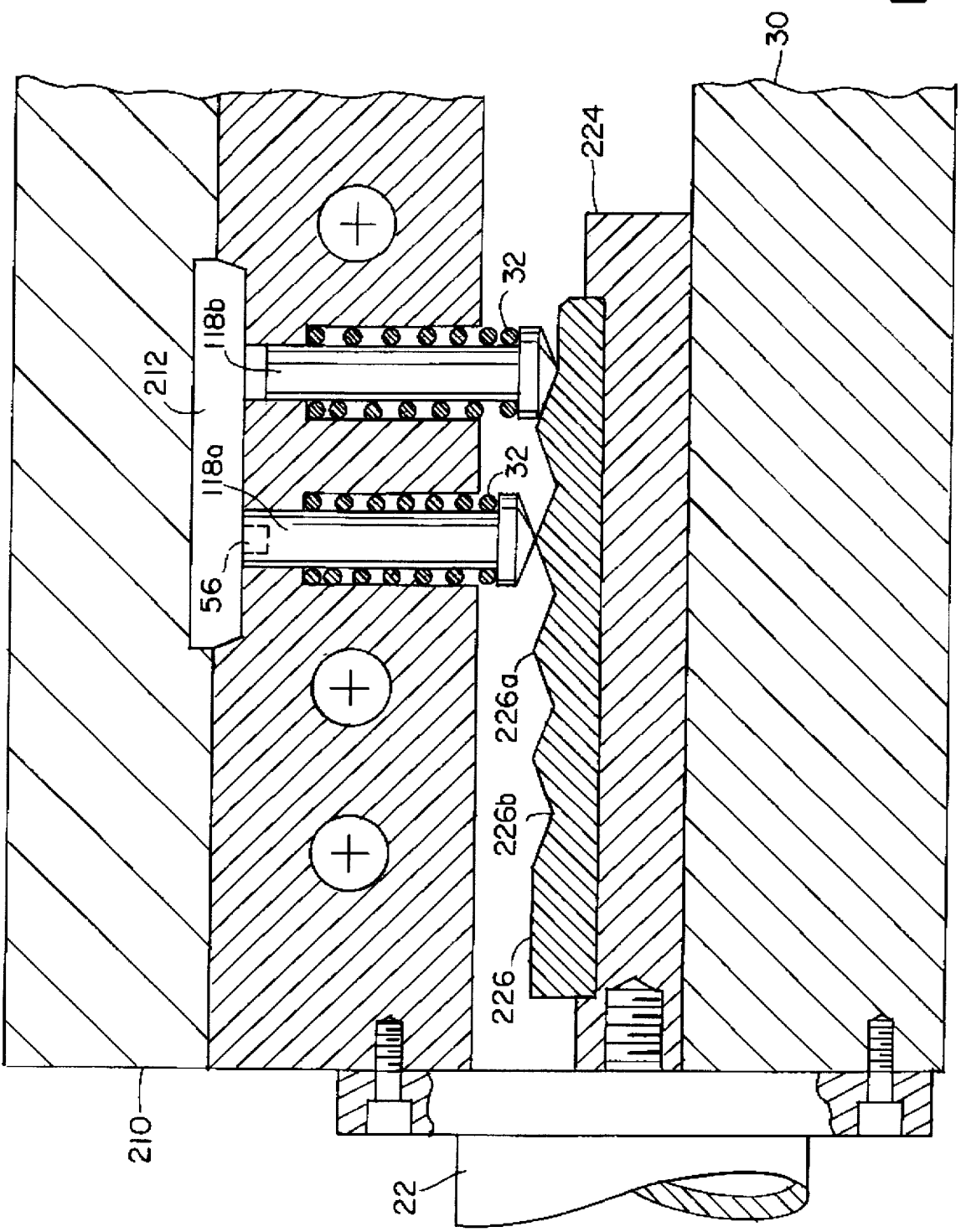
FIG. 6 is a side sectional view of another preferred embodiment of the present invention.

FIGS. 6 and 7 depict another preferred embodiment of the present invention. Mold 210 differs from mold 10 in that two reciprocating pins 118a and 118b extend through mold 210. Pressure sensor 56 is located at the tip of pin 118a. This simplifies the installation of pressure sensor 56 since a separate hole does not have to be drilled in mold 210. Cam holder 224 is slightly longer than cam 24 to provide a longer cam 226. Reciprocating pins 118a and 118b ride up and down hills 226a and valleys 226b to displace material within mold cavity 212. Although pins 118a and 118b are shown to alternately reciprocate, alternatively, pins 118a and 118b can reciprocate at the same time. The use of two reciprocating pins 118b and 118a increases mixing as well as the strength of weld line 20 over that caused by a single reciprocating pin. Two or more reciprocating pins can be used when a large weld line or multiple weld lines exist in a molded part.

Figure 8:
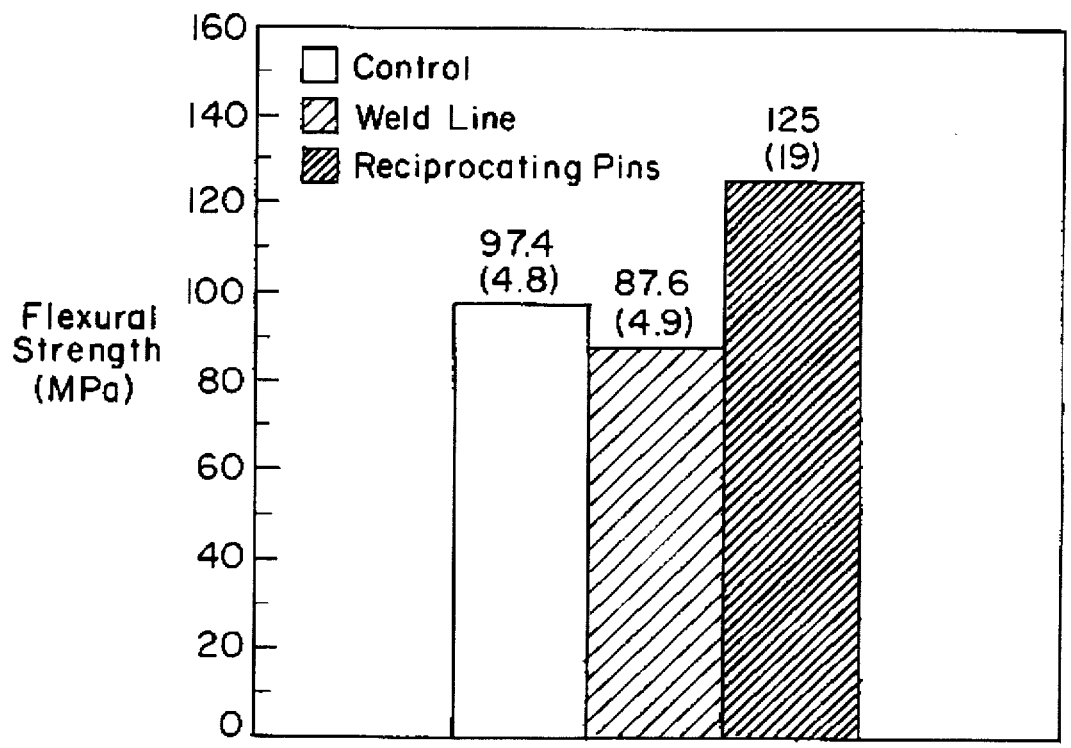
FIG. 8 is a graph depicting the flexural strengths for a molded plastic sample without a weld line, a sample with an unstrengthened weld line, and a sample with a weld line strengthened by the present invention apparatus.

Referring to FIG. 8, the flexural strengths of a molded control sample having no weld line, a molded sample having an unstrengthened weld line, and a molded sample having a weld line strengthened by two reciprocating pins are shown.

Figure 9:
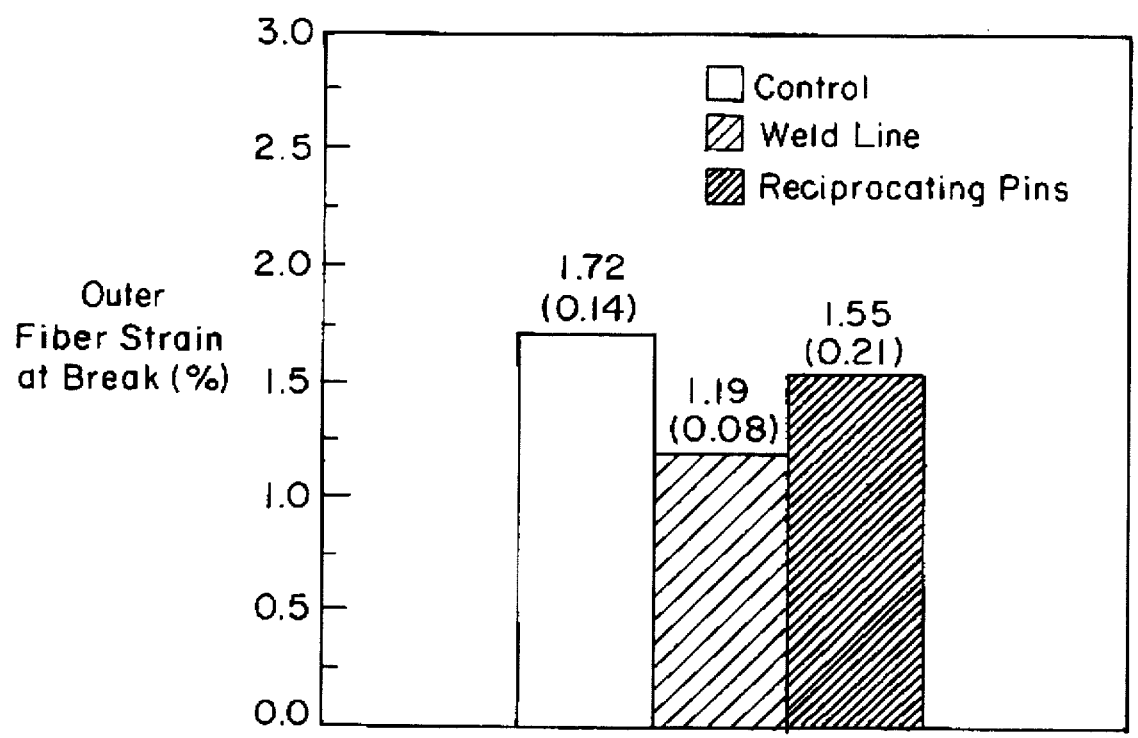
FIG. 9 is a graph depicting the breaking strain for a molded plastic sample without a weld line, a sample with an unstrengthened weld line, and a sample with a weld line strengthened by the present invention apparatus.

FIG. 9 discloses the breaking strain levels of a molded control sample having no weld line, a molded sample having an unstrengthened weld line, and a molded sample having a weld line strengthened by two reciprocating pins.

Although a translating cam has been depicted for reciprocating the pin 18, alternatively, the cam can be omitted and the cylinder 22 may be directly coupled to the pin 18 along the longitudinal axis of pin 18. Additionally, a motor driven mechanism such as a crank slider may be employed for reciprocating the pin 18. The pin 18 can also be driven by a rack and pinion or a ball screw driven by a motor. The motor can be an electric or hydraulic motor. Also, a rotating cam may be used to reciprocate pin 18. Furthermore, the reciprocating pin may be replaced with a steel diaphragm flush with the interior surface of the mold cavity which is displaced by a reciprocating pin or by pressurized fluid.

Equivalents

While this invention has been particularly shown and described with references to preferred embodiments thereof, it will be understood by those skilled in the art that various changes in form and details may be made therein without departing from the spirit and scope of the invention as defined by the appended claims. For example, the invention as presented here is described to have a cylindrical pin, the shape of the moving boundary is not limited to being round. The number of moving boundaries can also be increased and their respective movements timed to create a variety of flow and mixing effects. Additionally, although the present invention has been described to strengthen the weld line in molded plastic parts which receives molten thermoplastic from an injection molding machine, the present invention can be used to strengthen weld lines in parts molded from plastics received by other means. Also, the present invention can be employed to strengthen mold lines in parts molded from thermoset plastics as well as other types of hardenable materials such as metals, concrete and resins. Furthermore, although the present invention has been depicted to be used in conjunction with a simple mold having a core, the present invention can be used on a mold having any sort of geometry or complexity with or without cores.

What is claimed is:

1. A mold for strengthening weld lines formed in molded material during a molding process comprising:
   a mold body;
   a mold cavity formed within the mold body, the mold cavity having a mold cavity surface;
   a gate coupled to the mold cavity for filling the mold cavity with material, the mold having a geometrical feature which tends to create a weld line in the molded material within the mold cavity downstream from the geometrical feature during filling of the mold cavity;
   a passage extending through the mold body to the mold cavity at a location downstream from the geometrical feature in proximity to where the weld line tends to form in the molded material; and
   a reciprocating member extending along a longitudinal axis within the passage, the reciprocating member being capable of reciprocal movement along the longitudinal axis between a position flush with the mold cavity surface and a position proximal to the mold cavity surface.

2. The mold of claim 1 in which the reciprocating member reciprocates between a position flush with the mold cavity surface and a position slightly away from the mold cavity.

3. The mold of claim 1 further comprising an actuator for actuating the reciprocating member.

4. The mold of claim 3 in which the actuator is a fluid operated cylinder.

5. The mold of claim 4 further comprising a reciprocating cam coupled to the cylinder for actuating the reciprocating member, the cam having a surface which is in contact with the reciprocating member.

6. The mold of claim 5 in which the cam comprises a block having a series of peaks and valleys.

7. The mold of claim 1 further comprising a second reciprocating member reciprocating within a second passage extending through the mold body.

8. The mold of claim 3 further comprising a sensor for sensing the presence of material in the mold cavity for actuating the actuator.

9. The mold of claim 8 in which the sensor is positioned within the reciprocating member.

10. A mold for strengthening weld lines formed in molded material during a molding process comprising:
    a mold body;
    a mold cavity formed within the mold body, the mold cavity having a mold cavity surface;
    a gate coupled to the mold cavity for filling the mold cavity with material, the mold having a geometrical feature which tends to create a weld line in the molded material within the mold cavity downstream from the geometrical feature during filling of the mold cavity;
    a passage extending through the mold body to the mold cavity at a location downstream from the geometrical feature in proximity to where the weld line tends to form in the molded material;
    a reciprocating member extending along a longitudinal axis within the passage, the reciprocating member being capable of reciprocal movement along the longitudinal axis between a position flush with the mold cavity surface and a position proximal to the mold cavity surface; and
    an actuator for actuating the reciprocating member.

11. The mold of claim 11 in which the actuator is a fluid operated cylinder.

12. The mold of claim 11 further comprising a reciprocating cam coupled to the cylinder for actuating the reciprocating member, the cam having a surface which is in contact with the reciprocating member.

13. The mold of claim 12 in which the cam comprises a block having a series of peaks and valleys.

14. The mold of claim 10 further comprising a second reciprocating member reciprocating within a second passage extending through the mold body.

15. The mold of claim 10 further comprising a sensor for sensing the presence of material in the mold cavity for actuating the actuator.

16. The mold of claim 15 in which the sensor is positioned within the reciprocating member.

17. A mold for strengthening weld lines formed in mold material during a molding process comprising:

a mold body;

a mold cavity formed within the mold body, the mold cavity having a mold cavity surface;

a gate coupled to the mold cavity for supplying the mold material to the mold cavity;

a core member within the mold cavity for creating a void in the mold material, the core member forming an obstruction to the flow of mold material within the mold cavity tending to create a weld line in the mold material downstream from the core member during the molding process;

a passageway extending through the mold body to the mold cavity surface at a location downstream from the core member in proximity to where the weld line tends to form in the mold material; and a reciprocating member extending within the passageway for reciprocal movement between a position flush with the mold cavity surface and a position proximal to the mold cavity surface.

18. A mold for strengthening weld lines formed in molded material during a molding process comprising:

a mold body;

a mold cavity formed within the mold body, the mold cavity having a mold cavity surface;

a gate coupled to the mold cavity for providing a fluid passageway for entry of fluid mold material into the mold cavity, a fluid obstructing member within the mold cavity in the path of said fluid mold material tending to create a weld line in the mold material adjacent said obstructing member;

a passage extending through the mold body to the mold cavity surface adjacent said weld line; and a reciprocating member extending along the passage for reciprocal movement between a position flush with the mold cavity surface and a position proximal to the mold cavity surface, thereby displacing and mixing mold material in the area of the weld line to strengthen the weld line.

19. A mold for strengthening weld lines formed in molded material during a molding process comprising:

a mold body;

a mold cavity formed within the mold body, the mold cavity having a mold cavity surface;

a gate coupled to the mold cavity for passage of mold material into the mold cavity, an obstructing member in the mold cavity tending to create a weld line in the mold material within the mold cavity downstream from the obstructing member during the molding process;

a passageway extending through the mold body to the mold cavity surface at a location opposite where the weld line tends to form in the mold material;

a reciprocating member extending along a longitudinal axis within the passageway for reciprocal movement along the longitudinal axis between a position flush with the mold cavity surface and a position proximal to the mold cavity surface; and an actuator for reciprocating the reciprocating member.

* * * * *

UNITED STATES PATENT AND TRADEMARK OFFICE
CERTIFICATE OF CORRECTION

PATENT NO. : 5,538,413
DATED : July 23, 1996
INVENTOR(S) : Garrett Gardner and Robert Malloy It is certified that error appears in the above-indentified patent and that said Letters Patent is hereby corrected as shown below:

Claim 11, column 6, line 50, delete "claim 11" and insert in its place ---claim 10---.

Signed and Sealed this

Twenty-ninth Day of October 1996

*Attest:*

BRUCE LEHMAN

*Attesting Officer*  *Commissioner of Patents and Trademarks*